Feb. 6, 1934. T. E. STOCKDALE ET AL 1,946,118

CHAMBER COIL CONNECTION

Filed Feb. 9, 1931

Witness:
R. B. Davison

Inventors:
Thomas F. Stockdale +
George M. Keranen
By Bruce K. Brown
Atty

Patented Feb. 6, 1934

1,946,118

UNITED STATES PATENT OFFICE

1,946,118

CHAMBER COIL CONNECTION

Thomas E. Stockdale, Hammond, Ind., and George M. Keranen, Chicago, Ill., assignors to Standard Oil Company, Chicago, Ill., a corporation of Indiana Application February 9, 1931. Serial No. 514,370

2 Claims. (Cl. 285—22)

This invention pertains to pipe joints or connections and more particularly to an arrangement whereby a pipe or the like may be removably connected with another pipe, a valve or the like through the wall of a chamber or the like between which wall and the pipe it is necessary or desirable to maintain a tight seal. The invention will be disclosed in an application to a bubble tower for fractional distillation since such an apparatus affords an excellent example of the adaptability and usefulness of the invention as well as its functions. However, the invention is not limited in application to bubble towers, as will be appreciated.

Where, as in a closed chamber such as a bubble tower, it becomes necessary to install a pipe coil such, for instance, as a stripping coil and to remove and repair the coil and replace it or substitute a new coil, it has heretofore been common practice to provide apertures through the wall of the tower and to weld the pipe ends to the wall circumferentially of the openings, the openings each being just large enough to permit the passage of the pipe end therethrough. With this arrangement an absolutely perfect weld is necessitated in order to seal the joint or space between the pipe and the wall against ingress of air or egress of vapor, etc. Removal of the pipe, however, requires this seal to be broken and if the seal is a proper one, it is often necessary to chisel or burn away the weld or a portion of the wall surrounding the same in order that the pipe may be removed. This effects a weakening of the tower wall every time it becomes necessary to remove the pipe and gives considerable trouble in effecting a tight seal between the wall and the pipe when it is replaced besides being an expensive and difficult piece of work. If inflammable vapors or liquids are contained within the tower, a serious fire hazard may be created.

Stuffing boxes are not satisfactory even were it not for the fact that there are comparatively few instances where such devices could be used and other arrangements to avoid the difficulties above mentioned or some of them, have been found or are deemed to be equally undesirable or unsatisfactory. We have devised an arrangement which we have found in practice to be entirely satisfactory, even in connection with the walls of towers and tanks containing the most highly inflammable vapors under considerable pressure, as well as simple and cheap to manufacture, install and dismember. The arrangement is such that a pipe may be disposed through a wall and connected up with another pipe or the like or disconnected from that with which it is connected and removed with the utmost facility and without weakening or otherwise affecting the wall of the tank, chamber or other apparatus through which the pipe must pass. In addition, our improved connection insures that any leakage which may occur as a result of failure of the gaskets, etc. cannot gain access to the inside of the apparatus or tower and become a source of contamination. These may be said to be some of the objects of our invention, but other objects, as well as the advantages, uses and purposes, will be or should become clearly understood and appreciated after reading the following description and claims and after viewing the drawing in which:

Figure 1:
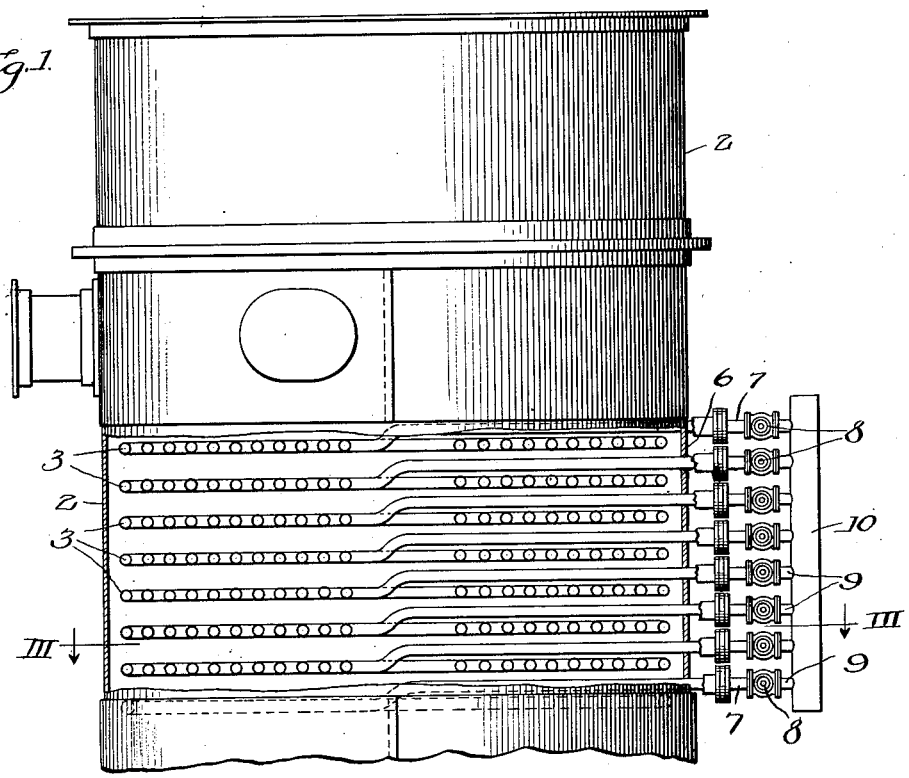
Fig. 1 is an elevational view, partially in section, of an upper portion of a bubble tower showing one form of our invention applied thereto in connection with the installation of what are commonly known as pancake coils.
Figure 2:
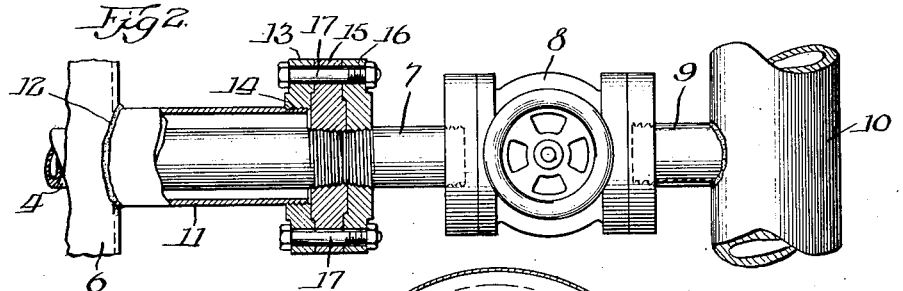
Fig. 2 is an enlarged detail view, partially in section, of one of the coil connections.
Figure 3:
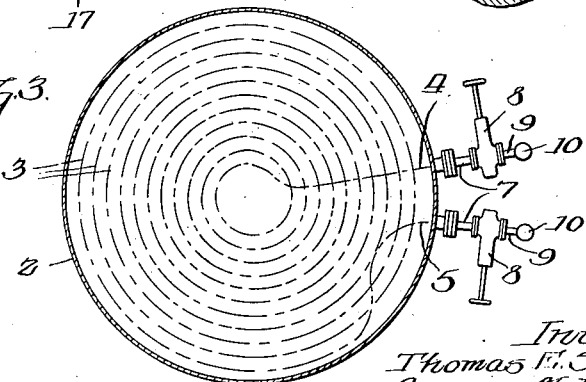
Fig. 3 is a plan view taken substantially along the line II—II of Fig. 1, but on a reduced scale.

The bubble tower portion illustrated includes a section 2 within which eight exchanger coils 3 of pancake type are disposed. The ends of one of the coils are diagrammatically indicated at 4 and 5 in Fig. 3. These ends pass out through spaced openings in the wall 6 and may be connected through nipples 7, valves 8 and nipples 9 to headers 10.

The openings through the tower wall through which the pipe ends pass are made somewhat larger than the outside diameter or the greatest dimension of the pipe so that there is a reasonable clearance between the pipe and the marginal edges of the wall about each opening. A sleeve or nipple 11 of an internal diameter or internal dimensions sufficiently greater than the outside diameter of the pipe end 4 to give substantially the same clearance from the pipe as the opening in the wall is welded or otherwise tightly sealed to the wall 6 as shown at 12. The outer end of this sleeve or nipple 11 is provided with a flange 13 which may be attached by threads 14 or otherwise as may be preferred or necessity may require. The pipe end 4 is similarly provided with a flange 15 between which and a flange 16 provided on the nipple 7 and between which and the flange 13 gaskets may be interposed, if desired. Bolts 17 are disposed through aligned apertures in the several flanges and serve to clamp the flanges, the gaskets and the pipes tightly together. Every other pipe end may be connected to its header in a similar manner.

It will now be appreciated that when it is desired to install a coil in place within a chamber, such as that illustrated, and connect the ends thereof with piping on the exterior through openings in the wall, the coil may be lowered through the top and as the pipe nears its position the ends may be worked into and through the sleeves 11 to their proper positions. The flanges 15 may then be fixed on the ends of the coil and secured between the flanges 13 and 16 which will have been placed in their respective positions previously thereto. Disconnection and removal of a coil may likewise be made quickly and efficiently. By reason of the permanent connection of the sleeve or nipple 11 with the wall, the wall is in no wise structurally or otherwise affected by removal or insertion of a coil. Furthermore, differential expansion of the coil and tower wall may take place with a minimum effect upon the joint 12.

The coil ends need not be connected through nipples 7 and, if it be desired, the flange 15 may be connected directly to one of the flanges of the valve 8 or to the flange by which the nipple 9 is connected to the valve 8. In other words, the connection need not be made between a pipe and a pipe per se, because the invention is applicable to various connections between fluid conduits which in the art may not strictly be termed pipes. Therefore, while we have described and illustrated a preferred form of the invention and one embodiment thereof, we do not desire to be limited thereto but only by the spirit of the invention and the scope of the appended claims.

We claim:

1. A pipe joint for a jacketed pipe comprising, an annular flange member fixed to the outer end of the pipe jacket, a second flange member having a centrally located threaded bore therethrough for receiving the threaded outer end of the jacketed pipe, a third flange member having a central threaded bore therethrough for receiving the threaded end of a pipe to be joined with said jacketed pipe, means for compressing the second flange member between the first named and said third flange member to secure the flanges into close abutting relationship, and means independent of said securing means for axially aligning the said flange members.

2. A pipe joint for a jacketed pipe comprising, an annular flange member fixed to the outer end of the pipe jacket, a second flange member having a centrally located threaded bore therethrough for receiving the threaded outer end of the jacketed pipe, a third flange member having a central threaded bore therethrough for receiving the threaded end of a pipe to be joined with said jacketed pipe, means for compressing the second flange member between the first named and said third flange member to secure the flanges into close abutting relationship, means maintaining axial alignment between the first and second flange members, and means maintaining axial alignment between the second and third flange member, said aligning means being operable independently of said securing means.

THOMAS E. STOCKDALE.
GEORGE M. KERANEN.